Figure 1:
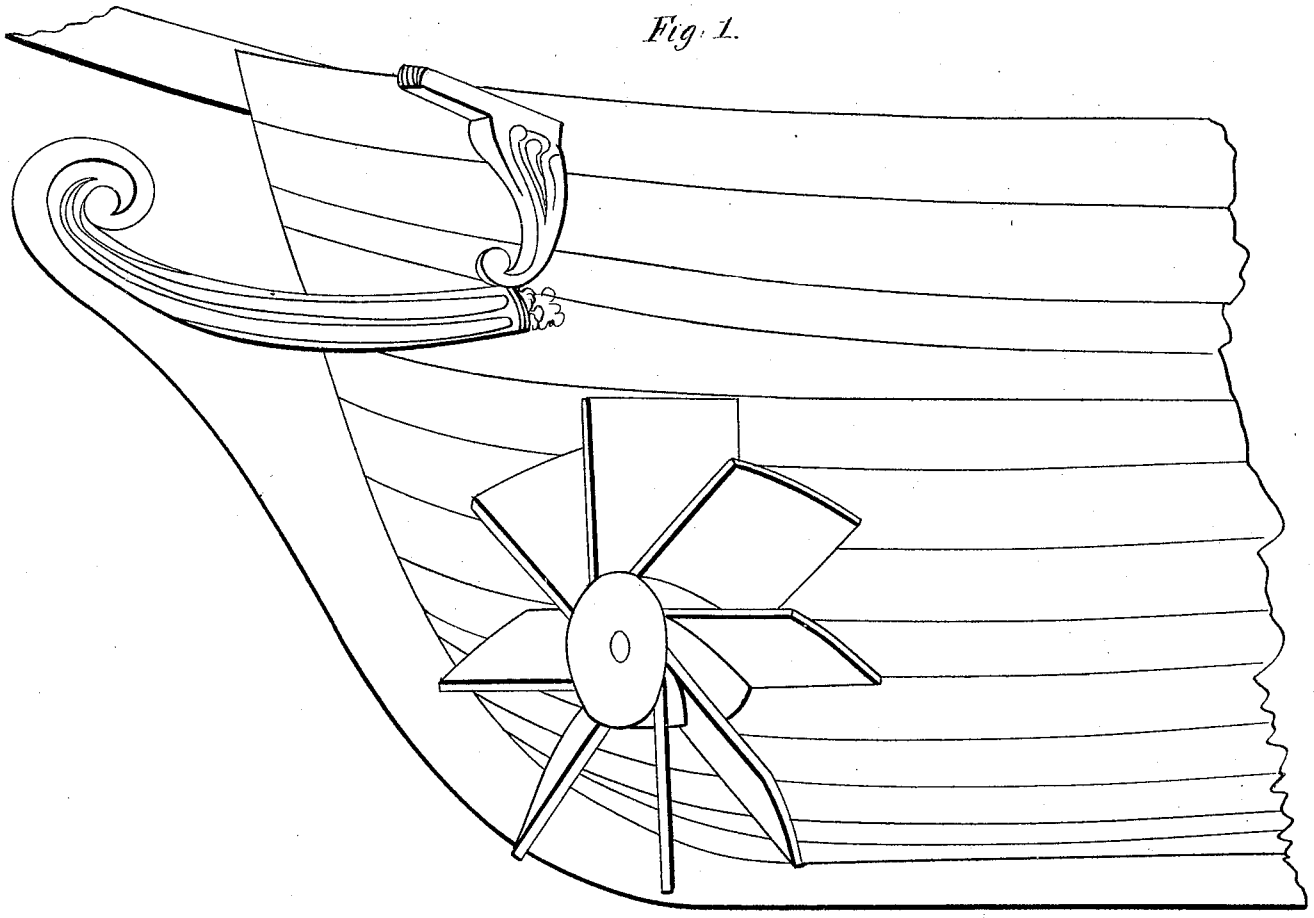
Figure 3:
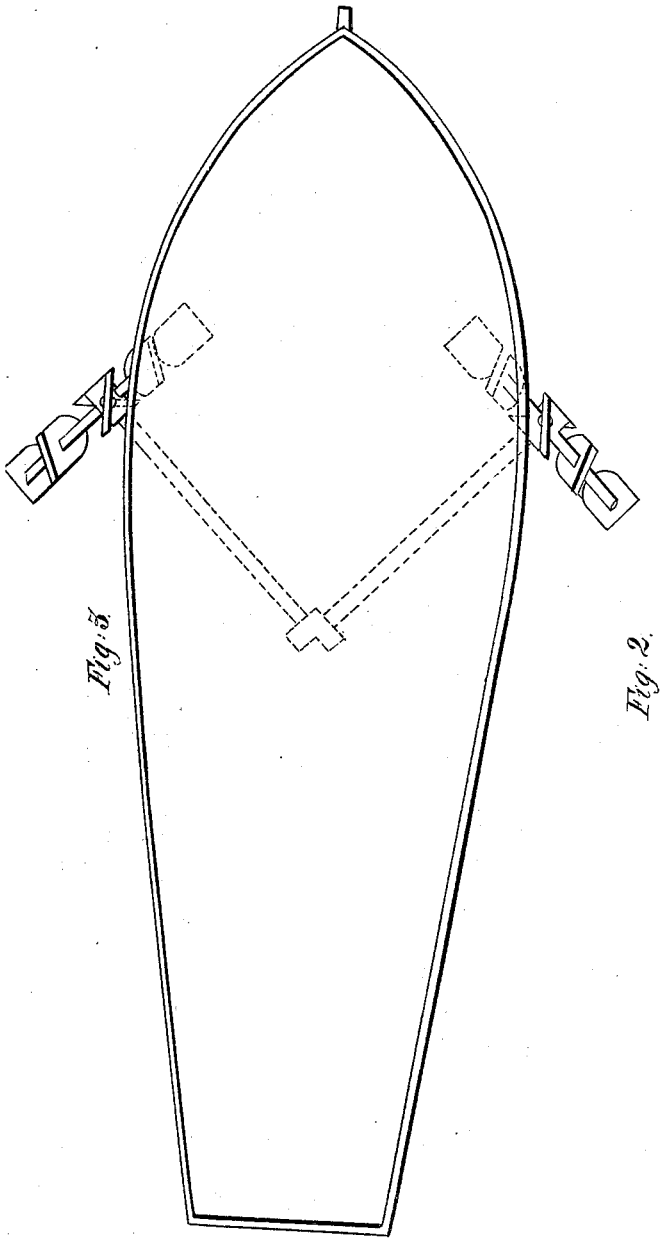
Figure 2:
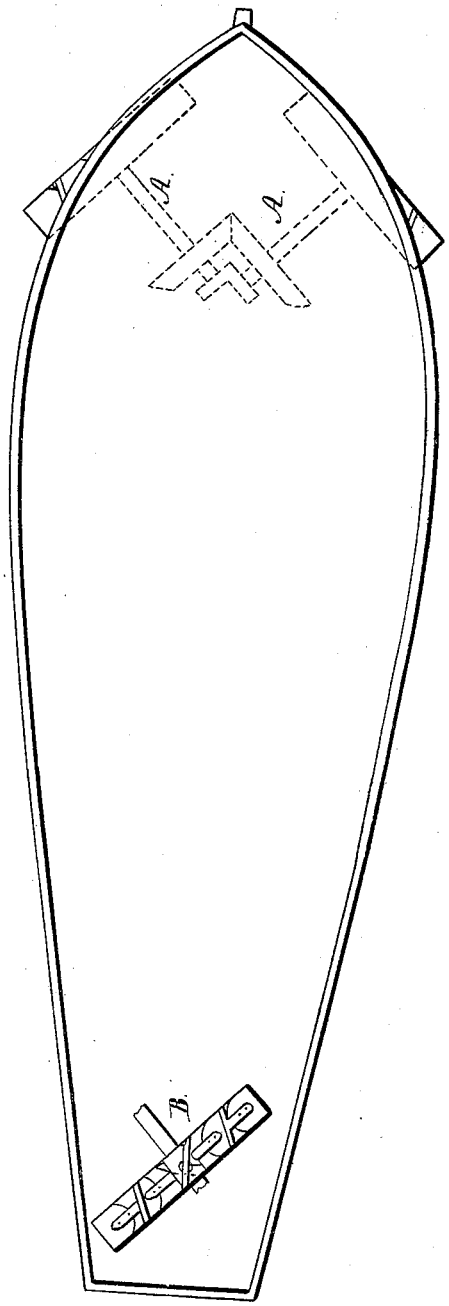

No Printed Specification Available

5733X

2 Sheets. Sheet 1.

J. Perkins,

Screw Propeller.

Patented Nov. 30, 1829.

N. PETERS, PHOTO-LITHOGRAPHER, WASHINGTON, D. C.

Printed Specification Available

5733X

J. Perkins,
Screw Propeller.

Patented Nov. 30, 1829.

N. PETERS, PHOTO-LITHOGRAPHER, WASHINGTON, D. C.

United States Patent Office

PTO - BOYERS, PA Duty Station

MISSING PAGE TEMPORARY NOTICE

PATENT # 5733 X FOR ISSUE DATE 11-30-1829 HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

Del Text

Data Conversion Operation

Boyers, Pa